(12) United States Patent
Keuten et al.

(10) Patent No.: US 10,113,918 B2
(45) Date of Patent: Oct. 30, 2018

(54) ARRANGEMENT OF A SENSOR FOR MEASURING THE TEMPERATURE OF A MEDIUM IN A MOTOR VEHICLE

(71) Applicant: CONTI TEMIC MICROELECTRONIC GMBH, Nuremberg (DE)

(72) Inventors: Matthias Keuten, Altdorf (DE); Andreas Voegerl, Parsberg (DE); Juergen Henniger, Erlangen-Dechsendorf (DE); Daniel Guenther, Fuerth (DE); Matthias Wieczorek, Neunkirchen am Sand (DE); Lisa-Maria Wittmann, Alesheim (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 267 days.

(21) Appl. No.: 15/024,122

(22) PCT Filed: Sep. 12, 2014

(86) PCT No.: PCT/EP2014/069514
§ 371 (c)(1),
(2) Date: Mar. 23, 2016

(87) PCT Pub. No.: WO2015/039968
PCT Pub. Date: Mar. 26, 2015

(65) Prior Publication Data
US 2016/0238458 A1 Aug. 18, 2016

(30) Foreign Application Priority Data
Sep. 23, 2013 (DE) .......................... 10 2013 219 091

(51) Int. Cl.
*G01K 7/16* (2006.01)
*G01K 1/16* (2006.01)

(52) U.S. Cl.
CPC ................. *G01K 7/16* (2013.01); *G01K 1/16* (2013.01); *G01K 2205/00* (2013.01)

(58) Field of Classification Search
CPC ...... G01K 7/16; G01K 2007/163; G01K 1/16; G01K 2205/00; H01C 7/00
See application file for complete search history.

(56) References Cited

U.S. PATENT DOCUMENTS 4,142,170 A   2/1979  Blatter
4,420,738 A   12/1983 Rehmann et al.
(Continued)

FOREIGN PATENT DOCUMENTS

DE   2528187 A1   1/1976
DE   3044419 A1   6/1982
(Continued)

*Primary Examiner* — Lisa Caputo
*Assistant Examiner* — Philip Cotey
(74) *Attorney, Agent, or Firm* — Laurence A. Greenberg; Werner H. Stemer; Ralph E. Locher

(57) ABSTRACT

Arrangement of a sensor for measuring the temperature of a medium in a motor vehicle. The sensor has a sensor body and two connecting wires. The first connecting wire and the major part of the sensor body is in direct contact with the medium. The second connecting wire is completely insulated from the medium.

9 Claims, 1 Drawing Sheet

(56) References Cited

U.S. PATENT DOCUMENTS

| | | | |
|---|---|---|---|
| 5,462,359 A | 10/1995 | Reichl et al. | |
| 7,439,845 B2 * | 10/2008 | Houben | G01K 1/08 29/610.1 |
| 7,946,505 B2 * | 5/2011 | Lynam | B60H 1/00785 236/44 C |
| 2010/0158073 A1 * | 6/2010 | Marks | G01K 15/00 374/183 |

FOREIGN PATENT DOCUMENTS

| | | |
|---|---|---|
| DE | 4108789 A1 | 7/1992 |
| DE | 4237224 A1 | 5/1994 |
| DE | 4339631 A1 | 12/1994 |
| GB | 1472733 A | 5/1977 |
| JP | S5499483 A | 8/1979 |
| JP | H07140013 A | 6/1995 |
| JP | 2002156290 A | 5/2002 |
| JP | 2004093253 A | 3/2004 |

* cited by examiner

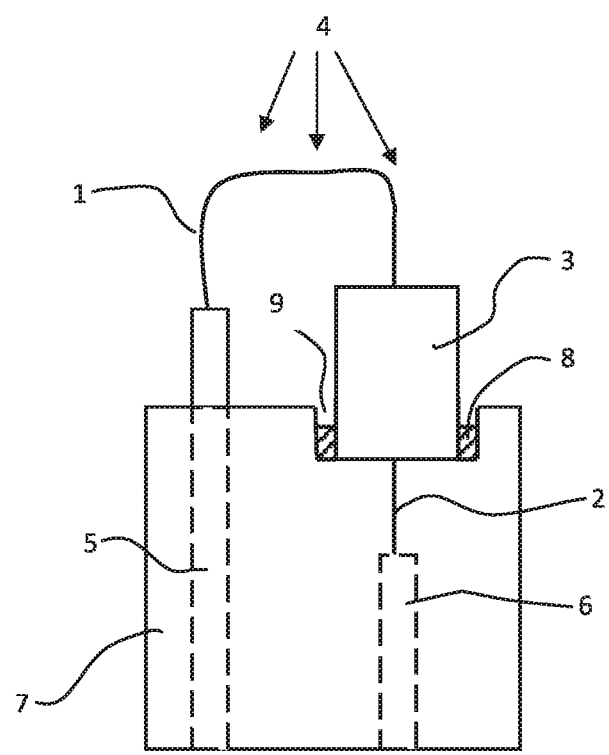

ARRANGEMENT OF A SENSOR FOR MEASURING THE TEMPERATURE OF A MEDIUM IN A MOTOR VEHICLE

BACKGROUND OF THE INVENTION

Field of the Invention

The invention relates to an arrangement of a sensor for measuring the temperature of a medium in a motor vehicle, wherein the sensor comprises a sensor body and two connecting wires.

Temperature sensors in particular for measuring the temperature of a medium such as oil or cooling fluid in a motor vehicle generally change their electrical characteristics in dependence upon the prevailing temperature. For example, their electrical resistance drops as the temperature of a component that is embodied from carbon or a semi-conducting material increases. Consequently, the temperature can be ascertained fairly precisely by virtue of measuring the resistance in the area of the high increase. Such materials conduct the current more efficiently when hot rather than when cold, they are therefore also referred to as thermistors or NTC (negative temperature coefficient) resistors. Metals such as for example platinum demonstrate the opposite effect and are therefore referred to as PTC (positive temperature coefficient) resistors.

In general, the sensor resistor that is surrounded directly by the medium is connected to a supply voltage by its two connectors that can be embodied as pins or short legs. The voltage that drops at a measuring resistor that is parallel connected to the sensor resistor is ascertained and evaluated in a control unit.

The increase in temperature of the medium can be transmitted to the sensor by way of the two short connecting legs and simultaneously by way of the lateral surfaces. The surface area that transmits the temperature is large and therefore the response time of the measuring procedure is short. However, there is a great risk of a short circuit occurring between the short connecting legs, in particular as a result of chippings, such as can easily occur in a motor or a transmission as a result of friction between rotating parts.

BRIEF SUMMARY OF THE INVENTION

It is therefore the object of the present invention to produce an arrangement of a sensor for measuring the temperature of a medium in a motor vehicle of the type mentioned in the introduction in such a manner that a short as possible response time is guaranteed in the case of increased protection against short circuits.

This object is achieved in accordance with the invention by virtue of an arrangement having the features as claimed.

The inventive arrangement of the sensor wherein the first connecting wire and the majority of the sensor body are in direct contact with the medium guarantees a short response time as a consequence of which rapid temperature changes can also be ascertained. Simultaneously, the risk of a short circuit occurring between the connecting wires, in particular as a result of chippings, such as can easily occur in a motor or a transmission as a result of friction between rotating parts, is considerably reduced, in that the second connecting wire is completely insulated from the medium. The sensor signal can be picked up at the connecting contacts that are held in such an insulated manner and said sensor signal can be supplied to an evaluating unit, in particular a control unit, for evaluation.

In an advantageous manner, each connecting wire can be connected in an electrically conductive manner by way of a separate connecting contact to a contact holder, wherein the sensor signal can be picked up at the contact holder. The connecting contact can be embodied as a stamped grid, as a flexible conductive foil or as any other electrical conductor, for example as a wire, depending upon the respective requirement or upon the design of the contact holder.

In order to further improve the response time of the measuring method, it is possible to enlarge the surface of the arrangement that comes into contact with the medium, in that in addition a part of the connecting contact of the first connecting wire protrudes out of the contact holder and provides an additional increase in temperature.

Depending upon the area of application, the sensor can be embodied as an NTC (negative temperature coefficient) resistor, for example from carbon or a semi-conducting material, having a negative temperature coefficient, or as a PTC (positive temperature coefficient) resistor, in particular from metal, having a positive temperature coefficient.

In order to still further reduce the risk of a short circuit occurring between the connecting wires, the sensor body in the contact holder, in particular in a recess that is suitable for receiving at least a part of the sensor body, can be surrounded in a sealing manner in part by an electrically insulating mass, such as for example epoxide resin or polyurethane, to prevent contact with the medium.

BRIEF DESCRIPTION OF THE DRAWING

Further features, advantages and details of the invention are evident in the description hereinunder in which a preferred exemplary embodiment is further explained with reference to the single drawing.

FIG. 1 illustrates an arrangement of a sensor for measuring the temperature of a medium 4 in a motor vehicle, wherein the sensor comprises a sensor body 3 and two connecting wires 1, 2. The first connecting wire 1 and the majority of the sensor body 3 are in direct contact with the medium 4 whose temperature is to be ascertained.

DESCRIPTION OF THE INVENTION

Each connecting wire 1, 2 is connected in an electrically conductive manner to a contact holder 7 by way of a separate connecting contact 5, 6, wherein the second connecting wire 2 and the associated connecting contact 6 are completely surrounded by the contact holder 7 and as a consequence are thermally and also electrically insulated from the medium 4. A sensor signal can be picked up at the contact holder 7.

As a result of this arrangement, the risk of a short circuit occurring between the connecting wires 1, 2 or between the connecting contacts 5, 6, in particular as a result of chippings, such as can easily occur in a motor or a transmission as a result of friction between rotating parts, is kept very low.

Simultaneously, the surface of the arrangement that transmits the temperature is large since the first connecting wire 1, the majority of the sensor body 3 and at least one part of the connecting contact 5 that is associated with the first connecting wire 1 comes into direct contact with the medium. As a consequence, the response time of the measuring procedure is short and it is also possible to detect rapid fluctuations in the temperature of the medium.

This arrangement in particular the arrangement of the first connecting wire 1 renders it possible to ascertain the temperature of the medium 4 even in areas that would otherwise be difficult to access for the sensor body 3, in that the first connecting wire 1 is shaped in a corresponding manner.

In FIG. 1, the sensor body 3 is arranged in a recess 9 of the contact holder 7 and is surrounded in a sealing manner in part by an electrically insulating mass 8 such as epoxide resin or polyurethane to prevent contact with the medium 4. This arrangement leads to an increase in the short-circuit resistance on the one hand and on the other hand fixes the sensor body 3 in the recess 9 in such a manner that damps vibration.

The invention claimed is:

1. A sensor arrangement for measuring a temperature of a medium in a motor vehicle, the arrangement comprising:
   a sensor having a sensor body and two connecting wires, including a first connecting wire and a second connecting wire;
   said first connecting wire and a majority of said sensor body being disposed in direct contact with the medium and said second connecting wire being completely insulated from the medium.

2. The sensor arrangement according to claim 1, which comprises a contact holder, and wherein each of said connecting wires is electrically conductively connected to said contact holder by way of a separate connecting contact, wherein a sensor signal is available at said contact holder.

3. The sensor arrangement according to claim 2, wherein said connecting contacts are formed as a stamped grid or as a flexible conductive foil.

4. The sensor arrangement according to claim 2, wherein said connecting contacts are formed by an electrical conductor.

5. The sensor arrangement according to claim 2, wherein a part of said connecting contact of said first connecting wire is disposed in contact with the medium.

6. The sensor arrangement according to claim 2, wherein said sensor body is disposed in a recess formed in said contact holder and partially surrounded in a sealing manner by an electrically insulating mass to prevent contact with the medium.

7. The sensor arrangement according to claim 1, wherein said sensor is a resistor having a negative temperature coefficient.

8. The sensor arrangement according to claim 1, wherein said sensor is a resistor having a positive temperature coefficient.

9. A sensor arrangement for measuring a temperature of a medium in a motor vehicle, the arrangement comprising:
   a sensor having a sensor body and two connecting wires, including a first connecting wire and a second connecting wire;
   said first connecting wire and a majority of a surface of said sensor body being disposed in direct contact with the medium and said second connecting wire being completely insulated from the medium.

* * * * *